(12) United States Patent
Yoshino (10) Patent No.: US 8,101,099 B2
(45) Date of Patent: Jan. 24, 2012

(54) OPTICAL WAVEGUIDE SUBSTRATE MANUFACTURING METHOD

(75) Inventor: Takashi Yoshino, Ama-Gun (JP)

(73) Assignee: NGK Insulators, Ltd., Nagoya (JP)

( * ) Notice: Subject to any disclaimer, the term of this patent is extended or adjusted under 35 U.S.C. 154(b) by 228 days.

(21) Appl. No.: 12/434,243

(22) Filed: May 1, 2009

(65) Prior Publication Data

US 2009/0230086 A1 Sep. 17, 2009

Related U.S. Application Data

(63) Continuation of application No. PCT/JP2007/072243, filed on Nov. 9, 2007.

(30) Foreign Application Priority Data

Nov. 9, 2006 (JP) .................................. 2006-303861

(51) Int. Cl.
*B29D 11/00* (2006.01)
(52) U.S. Cl. ..................... 264/1.27; 264/435; 264/449
(58) Field of Classification Search ................. 264/1.27, 264/435, 449
See application file for complete search history.

(56) References Cited

U.S. PATENT DOCUMENTS

| 3,110,141 | A | * | 11/1963 | Dalgleish ...................... 451/54 |
| 5,652,674 | A | | 7/1997 | Mizuuchi et al. |
| 5,756,263 | A | | 5/1998 | Gupta et al. |

FOREIGN PATENT DOCUMENTS

| JP | 04-335620 A1 | 11/1992 |
| JP | 08-220578 A1 | 8/1996 |
| JP | 09-026607 A1 | 1/1997 |
| JP | 2001-066652 A1 | 3/2001 |
| JP | 2003-270687 A1 | 9/2003 |
| JP | 2003-307757 A1 | 10/2003 |
| JP | 2004-045666 A1 | 2/2004 |
| JP | 2005-070194 A1 | 3/2005 |
| JP | 2005-070195 A1 | 3/2005 |

OTHER PUBLICATIONS

U.S. Appl. No. 12/434,207, filed May 1, 2009, Yoshino, Takashi.

* cited by examiner

*Primary Examiner* — Joseph Del Sole
*Assistant Examiner* — James Sanders
(74) *Attorney, Agent, or Firm* — Burr & Brown (57) ABSTRACT

A voltage is applied on an interdigitated electrode provided on one main face of a single-domain ferroelectric single crystal substrate to form a periodic domain inversion structure, the interdigitated electrode is removed and the one main face of the substrate is machined to remove the surface region of the substrate to form a machined surface. The optical waveguide is then formed in the substrate.

7 Claims, 11 Drawing Sheets

OPTICAL WAVEGUIDE SUBSTRATE MANUFACTURING METHOD

FIELD OF THE INVENTION

The present invention relates to a method for manufacturing an optical waveguide substrate usable for harmonic-generating devices and the like.

BACKGROUND OF THE INVENTION

The periodic formation of a domain inversion structure for forcibly inverting the polarization of ferroelectrics allows the implementation of optical frequency modulators utilizing surface acoustic waves, optical wavelength conversion devices utilizing the polarization inversion of nonlinear polarization, and the like. In particular, if the nonlinear polarization of nonlinear optical materials can be inverted periodically, high-efficiency wavelength conversion devices can be made; when light such as solid lasers is converted by using such devices, it will be possible to make small and lightweight short-wavelength light sources that can be applied for such fields as printing, optical information processing, and optical application measurement control.

As a method of forming a periodic domain inversion structure in a ferroelectric nonlinear optical material, so-called voltage application method is known. In this method, an interdigitated or comb-shaped electrode is formed on one main face of a ferroelectric single crystal substrate, a uniform electrode is formed on the other main face, and a pulse voltage is applied across both the electrodes. Such a method is described in Japanese Patent Publication Nos. H08-220578A, 2005-70195A and 2005-70194A.

SUMMARY OF THE INVENTION

In order to generate second harmonics from a nonlinear optical material such as a lithium niobate single crystal, there is a need to make a periodic polarization domain inversion within the single crystal. Then, the periodic domain inversion structure is formed in a ferroelectric single crystal substrate, following which a ridge channel optical waveguide is formed in a surface of the substrate by machining, laser machining, or the like. At that time, by providing the periodic domain inversion structure within the ridge optical waveguide, fundamental waves incident on the optical waveguide are modulated to higher harmonic waves.

However, it has been found that when a ridge optical waveguide is formed in a region with a periodic domain inversion structure formed therein and a fundamental wave is incident thereto, a considerable optical loss occurs and thus the harmonic output is extremely low. This is a phenomenon that has not been seen when the periodic domain inversion structure is used as a slab waveguide, and the phenomenon is beyond expectations.

An object of the present invention is, in forming an optical waveguide substrate having an optical waveguide with a periodic domain inversion structure formed therein, to reduce optical loss caused in the optical waveguide and to enhance the efficiency of harmonic generation.

The present invention provides a method of producing an optical waveguide substrate comprising an optical waveguide with a periodic domain inversion structure formed therein.

The method comprising the steps of:
applying a voltage on an interdigitated electrode provided on one main face of a single-domain ferroelectric single crystal substrate to form the periodic domain inversion structure;
removing the interdigitated electrode;
machining the one main face of the ferroelectric single crystal substrate to remove the surface region to form a machined surface; and
forming the optical waveguide in the ferroelectric single crystal substrate.

The present inventor pursued the cause of the problem that in the case where a periodic domain inversion structure is formed within an optical waveguide, optical loss in the optical waveguide is increased and the efficiency of harmonic generation is considerably decreased. As a result, it has been found that, when a voltage is applied in the step of making periodic domain inversion, damage occurs in a surface region of the ferroelectric single crystal. Such damage and its influence on harmonic generation have not been described in any literature.

As the cause is further investigated in detail, it has been found that while an electric field concentrates at the end edge of the interdigitated electrode and polarization inverted portion extends forward from the end of the electrode. It seems that, at portions direct under the end of the interdigitated electrode and the peripheries thereof, considerable damage to the crystal or crystal defects are caused. Therefore, it is considered that in the case where an optical waveguide is formed at these portions where polarization efficiency is presumably high, light propagating through the waveguide is affected by the damage.

Figure 6:
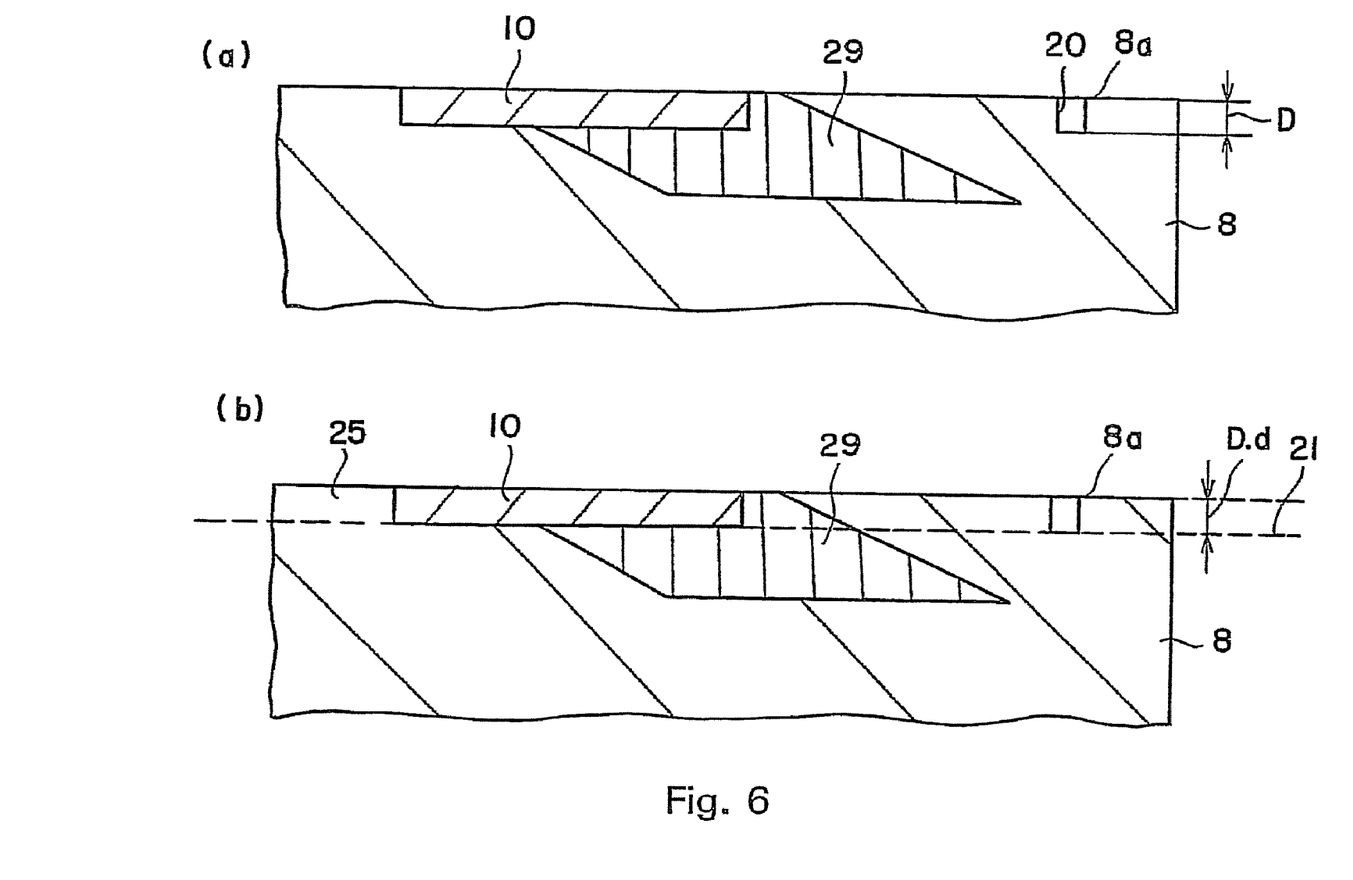
FIG. 6(a) is a cross-sectional view of the substrate 8 in which the periodic domain inversion structure 29, a damaged layer 10, and a recess 20 are formed.
FIG. 6(b) is a cross-sectional view of the substrate 8 for illustrating a step of removing a surface region 25.
Figure 7:
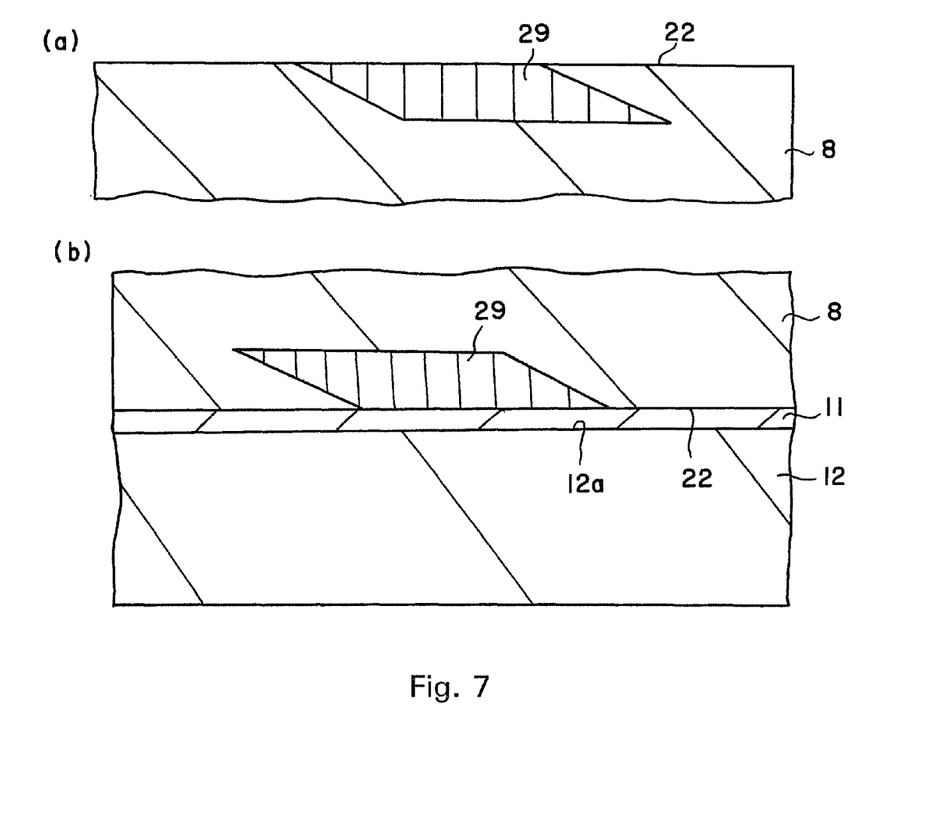
FIG. 7(a) is a cross-sectional view of the substrate 8 after the removal of the surface region.
FIG. 7(b) is a cross-sectional view of the substrate 8 adhered to the supporting body 12.

The inventor found based on these findings that, as shown in FIGS. 6 and 7 for example, by removing a surface region 25 of a ferroelectric single crystal substrate 8 through machining after the formation of a periodic domain inversion structure 29, a damaged layer 10 produced in voltage application can be removed or shrunk, optical loss in the optical waveguide can be considerably reduced, and therefore, the efficiency of harmonic generation can be increased.

DETAILED DESCRIPTION OF THE INVENTION

The present invention will be described in further detail below with appropriate reference to the drawings.

Figure 1:
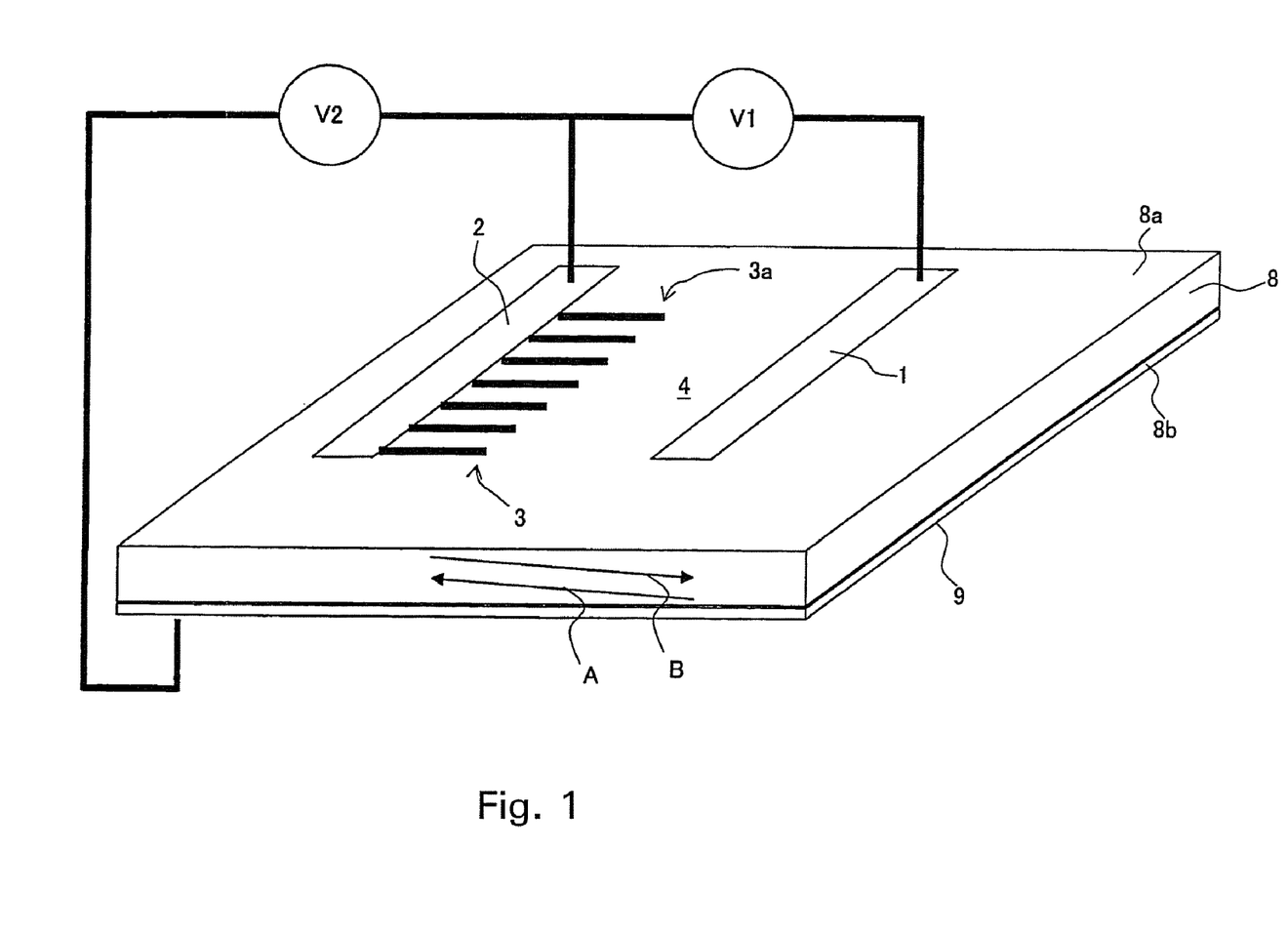
FIG. 1 is a schematic perspective view of a ferroelectric single crystal substrate 8 with a periodic domain inversion structure formed by voltage application method.

To begin with, a periodic domain inversion structure is formed in a ferroelectric single crystal substrate by using voltage application method. For example, as shown in FIG. 1, an offcut substrate formed of a ferroelectric single crystal is used as a substrate 8. Since a polarization direction A of the ferroelectric single crystal forms a predetermined angle, for example, an angle of 5° with respect to one main face 8a and the other main face 8b, the substrate 8 is called "offcut substrate".

On the one main face 8a of the substrate 8, an interdigitated electrode 3 and a counter electrode 1 are formed; on the other main face 8b thereof, a uniform electrode 9 is formed. The interdigitated electrode 3 has a number of elongated electrode pieces 3a arranged periodically and an elongated power supply portion 2 to which the roots of the electrode pieces 3a are connected. The counter electrode 1 is made of an elongated electrode piece, and is provided so as to be opposite to ends of the electrode pieces 3a.

Figure 2:
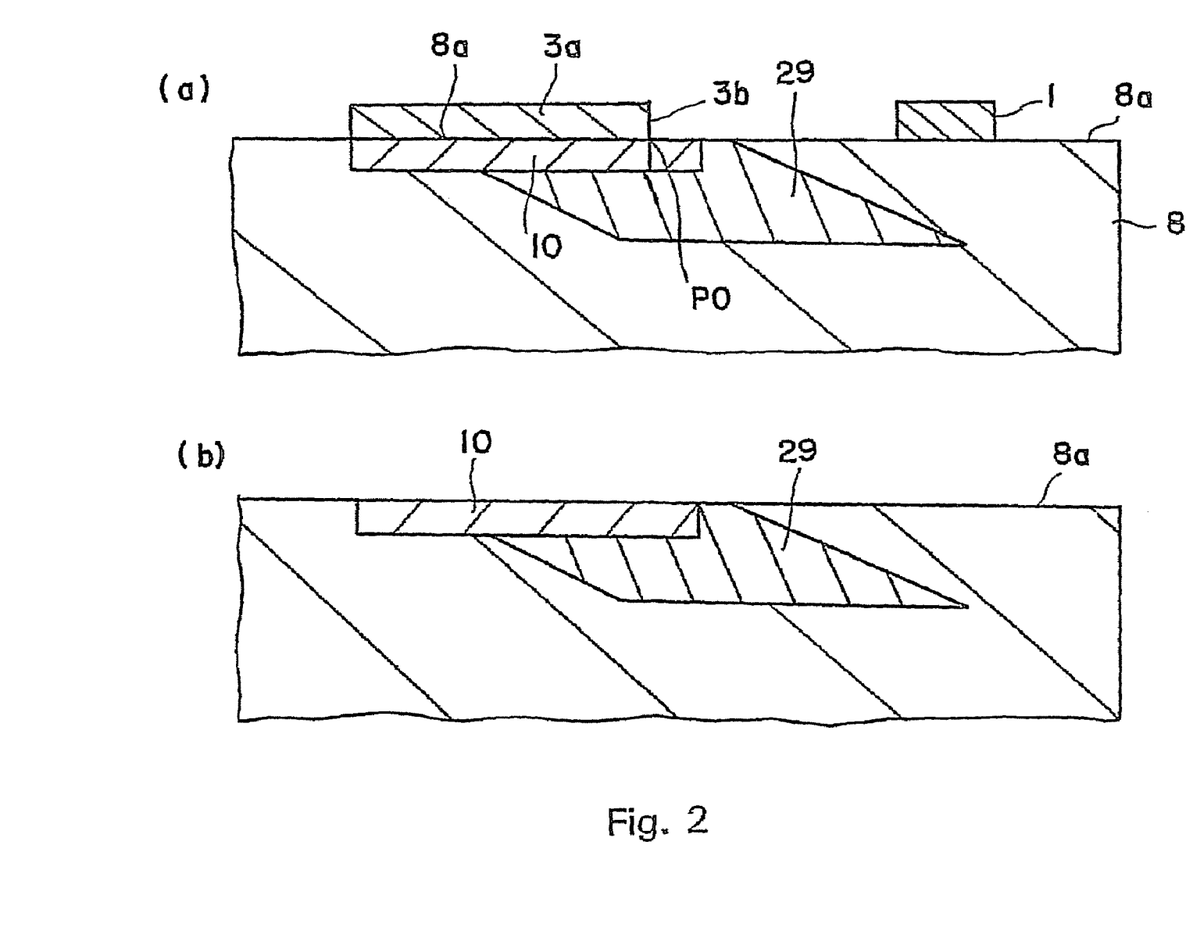
FIG. 2(a) is a cross-sectional view of the substrate 8 with a periodic domain inversion structure 29 formed therein.
FIG. 2(b) is a cross-sectional view of the ferroelectric single crystal substrate of FIG. 2(a) from which an electrode is removed.

Initially, the whole substrate 8 is polarized in the direction A. Then, a voltage V1 is applied between the interdigitated electrode 3 and the counter electrode 1, and a voltage V2 is applied between the interdigitated electrode 3 and the uniform electrode 9. As a result, as shown in FIG. 2(a), polarization-inverted portions gradually extend from the individual electrode pieces 3a in a direction parallel to a direction B. The polarization inversion direction B is opposite to the polarization noninversion direction A. And further, at places not corresponding to the electrode, that is, between the adjacent polarization-inverted portions, there are polarization-noninverted portions where polarization inversion does not occur. In this manner, a periodic domain inversion structure 29 with the polarization-inverted portions and the polarization-noninverted portions alternately arranged is formed.

In this case, however, as shown in FIG. 2(a), it has been found that a damaged layer 10 is formed immediately under the interdigitated electrode 3a and around the end edge 3b in a surface region of the one main face 8a of the substrate 8.

Figure 3:
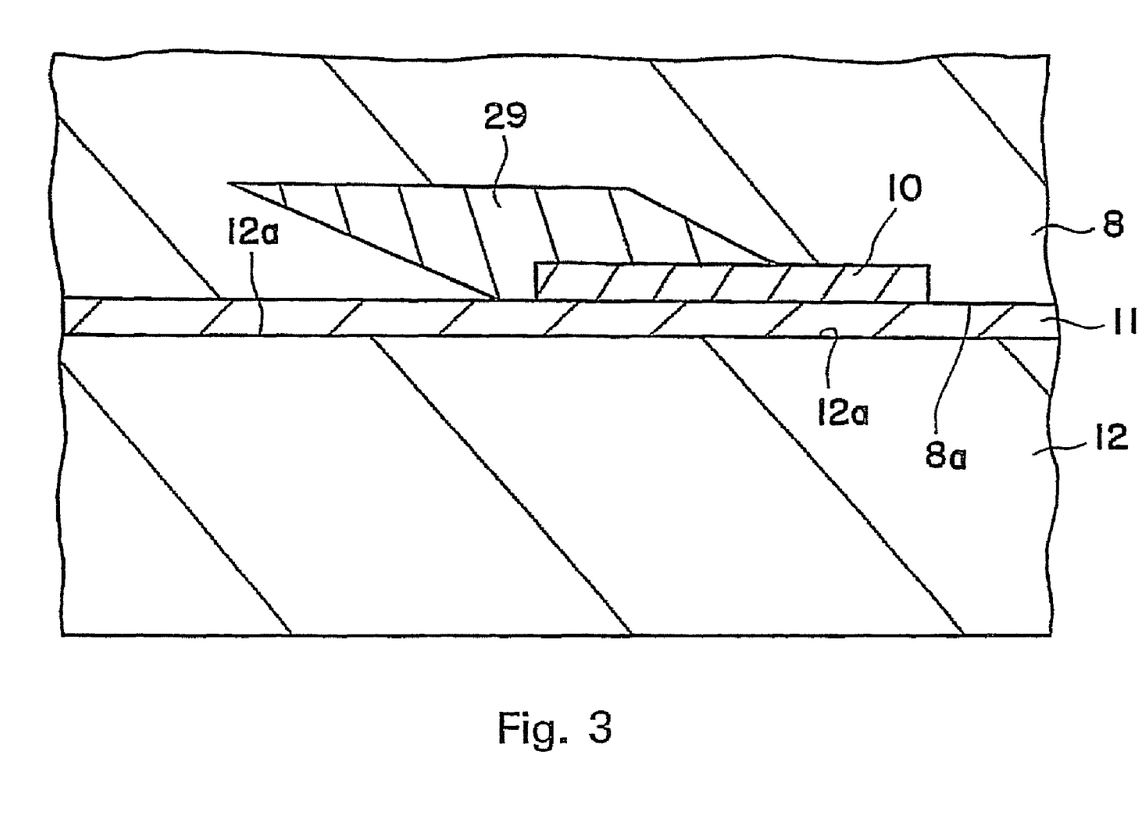
FIG. 3 is a cross-sectional view of the substrate 8 adhered to a supporting body 12.

In order to form the periodic domain inversion structure in a channel optical waveguide, the interdigitated electrode 3 is then removed to form a structure illustrated in FIG. 2(b). As shown in FIG. 3, the one main face 8a of the ferroelectric single crystal substrate 8 is adhered to a surface 12a of the supporting body 12. Then, the other main face 8b of the substrate 8 is ground to thin the substrate 8.

Figure 4:
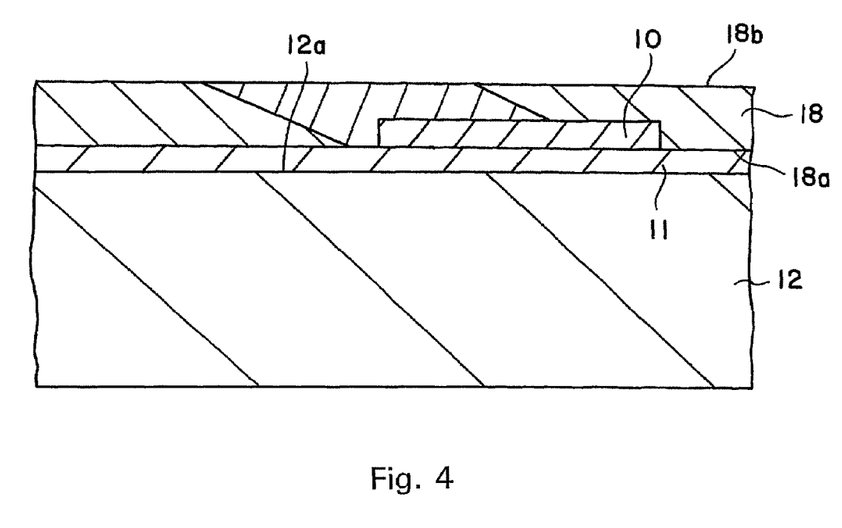
FIG. 4 is a cross-sectional view of the laminate of FIG. 3 in which a thin ferroelectric single crystal substrate 18 is formed by subjecting the substrate 8 to a thinning process.

As a result, as shown in FIG. 4, a substrate 18 is thinned. Reference number 18a denotes the one main face of the substrate 18, and reference number 18b denotes the other main face. The substrate 18 is adhered to the surface 12a of the supporting body 12 via an adhesion layer 11.

Figure 5:
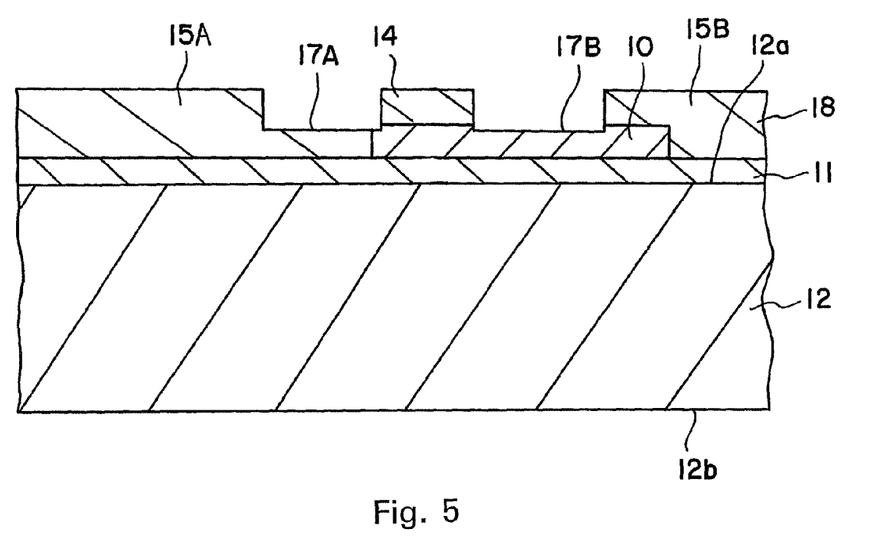
FIG. 5 is a cross-sectional view of a conventional optical waveguide device in which a ridge optical waveguide 14 is formed.

Thereafter, as shown in FIG. 5, by processing the substrate 18 from the other main face thereof, a ridge optical waveguide 14 is formed. In this case, by processing the ferroelectric single crystal substrate 18, a pair of grooves 17A and 17B are formed and extending portions 15A and 15B are made to remain on both sides of the grooves. Between the pair of grooves 17A and 17B, a ridge 14 is formed.

In the structure illustrated in FIG. 5, it has been found that the efficiency of harmonic generation considerably falls to an unexplainable extent. In the course of the consideration of the reason for the above, it has been thought that the damaged layer 10 is formed in the region under the interdigitated electrode as shown in FIG. 5, and the damaged layer 10 causes the losses of fundamental waves and harmonics propagating through the optical waveguide 14.

In order to substantiate such a thought, the present inventors, as shown in FIGS. 6(b) and 7 for example, have conceived of removing a surface region 25 of the substrate 8 by machining the one main face 8a to provide a machined surface. As a result, it has been found that the damaged layer 10 under the interdigitated electrode can be removed or shrunk and therefore the wavelength conversion efficiency in the optical waveguide can be enhanced considerably.

In the step of removing the surface region, as shown in FIG. 6(b) for example, the surface region 25 of the substrate 8 is removed to an extent indicated by a broken line 21 by machining the one main face 8a by a depth d. Accordingly, as shown in FIG. 7(a), the damaged layer is removed or shrunk on a machined surface 22 side.

The machining depth "d" set at this point is not particularly limited; but from the viewpoint of the removal of the damaged layer for the enhancement of the wavelength conversion efficiency, the depth "d" is preferably not less than 0.5 µm, more preferably not less than 1.0 µm. However, there is generally provided a limit to the depth of the periodic domain inversion structure, and the wavelength conversion efficiency tends to decrease with depth. Accordingly, as the machining depth "d" is increased, regions having no periodic domain inversion structure will be increasingly included in an optical beam. Therefore, the machining depth "d" is preferably 5.0 µm or less, more preferably 3.0 µm or less.

However, it should be noted that when the machining depth "d" is not constant, considerable variations in the wavelength conversion efficiency of the resultant devices occur. Therefore, in order to secure the uniform wavelength conversion efficiency of each device, the machining depth "d" needs to be constant. However, when the machining depth is not more than 0.1 µm for example, it would become difficult to measure the depth, and thus, constant-depth machining cannot be performed.

Therefore, in a preferred embodiment, a recess 20 with a bottom surface is formed on the one main face 8a side of the ferroelectric single crystal substrate, and then the surface region is removed until the recess 20 disappears. That is, as schematically illustrated in FIG. 6(a), the recess 20 is formed on the one main face 8a side of the substrate 8. A method for forming the recess is not limited; but preference is given to machining or laser machining. At the stage where the recess is formed, the depth "D" of the recess can be measured by means of a surface roughness tester (see FIG. 6(a)). By proceeding with the machining of the region in such a state, the recess 20 becomes shallow gradually. The depth of the recess 20 can be visually observed with a microscope in a continuous manner, and can be measured with the surface roughness tester, if necessary. And further, when the machining is stopped at the time of the disappearance of the recess 20, the machining depth "d" becomes equal to the depth D of the recess 20. On the other hand, when the machining is stopped at the time when the recess 20 still remains, the depth "s" of the recess at this point is measured; then, the machining depth d can be calculated by: (D−s).

By using the depth "D" of the recess measured before and after the machining as an indicator, the machining depth d can be measured precisely. In particular, such a method is preferred since the machining depth d can be set based on the depth D of the recess by stopping the machining at the time of disappearance of the recess.

A method used in machining the region is not particularly limited; examples of such a method include polishing, grinding, and wet etching. And further, examples of an abrasive used for the machining include the following.

colloidal silica
colloidal alumina
diamond abrasive grains

As shown in FIG. 7(*a*), at the time when the machining is finished, the machined surface 22 is provided on the surface of the substrate 8. Immediately under the machined surface 22, the damaged layer 10 does not remain or is thinned.

The optical waveguide may be also formed on the machined surface 8*a* of the substrate. In a preferred embodiment, the substrate is adhered to a supporting body, and then the substrate is thinned by subjecting the other main face to a thinning process. By thinning the ferroelectric single crystal substrate, the degree of light confinement within the optical waveguide is heightened and the efficiency of conversion to harmonics is enhanced, while a desired mechanical strength can be provided even when the substrate is thinned.

That is, as shown in FIG. 7(*b*), the machined surface 22 of the ferroelectric single crystal substrate 8 is adhered to the surface 12*a* of the supporting body 12. Then, the substrate 8 is thinned by subjecting the other main face 8*b* to a thinning process.

Figure 8:
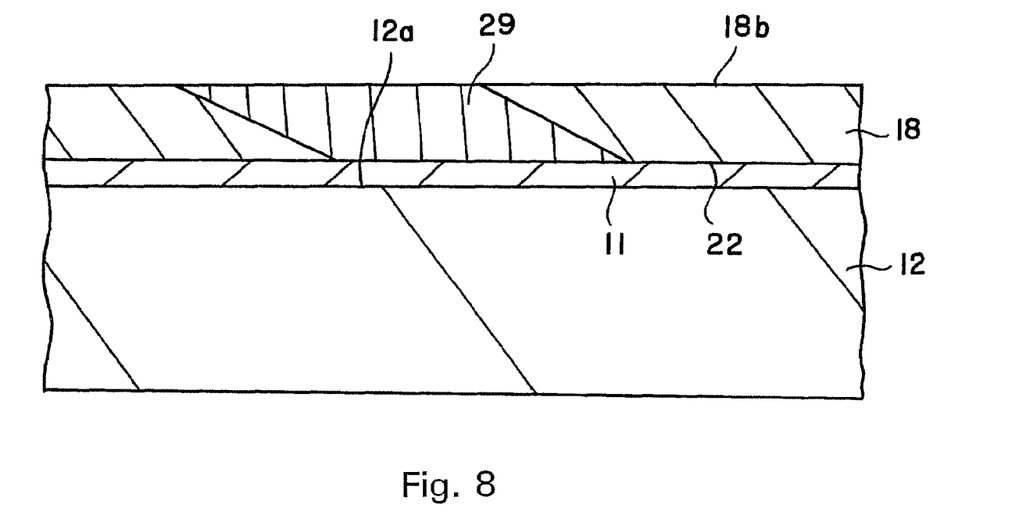
FIG. 8 is a cross-sectional view of the substrate 18 which is further thinned.

Therefore, as shown in FIG. 8, the substrate 18 is thinned. Reference numeral 22 denotes a machined surface of the substrate 18, and reference numeral 18*b* denotes the other main face thereof. The substrate 18 is adhered to the surface 12*a* of the supporting body 12 via the adhesion layer 11. Since the substrate 18 can be used as a slab optical waveguide after the adjustment of the thickness, the optical waveguide substrate 18 of FIG. 8 falls within the scope of the present invention. For this, the thickness of the substrate 18 is preferably set at 2.0 to 10.0 µm, more preferably 3.0 to 6.0 g/m.

Figure 9:
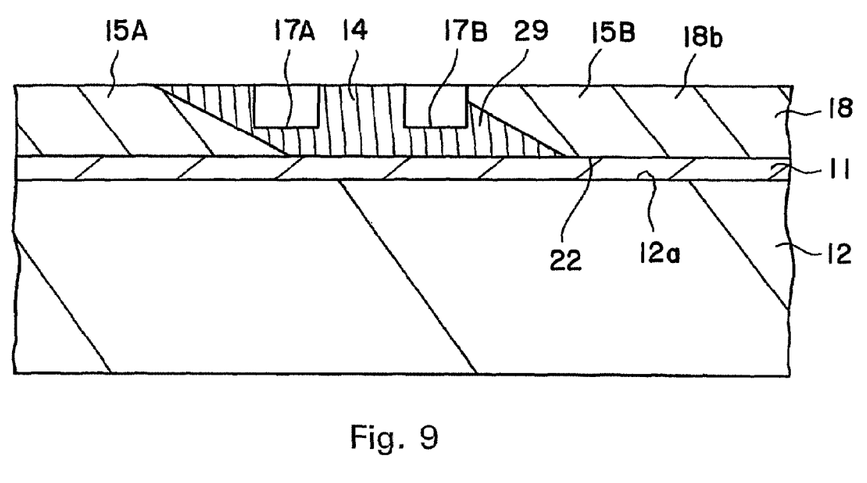
FIG. 9 is a cross-sectional view of an optical waveguide substrate having the ridge optical waveguide 14.

Next, as shown in FIG. 9, the ridge optical waveguide 14 is formed within the substrate 18 by subjecting the other main face 18*b* to a process. In this case, by processing the ferroelectric single crystal substrate 18, a pair of grooves 17A and 17B are formed and the extending portions 15A and 15B are left on both sides of the grooves. Between the pair of grooves 17A and 17B, the ridge 14 is formed. In the region within the optical waveguide 14, the damaged layer is not included or is included in a minimum volume.

Figure 10:
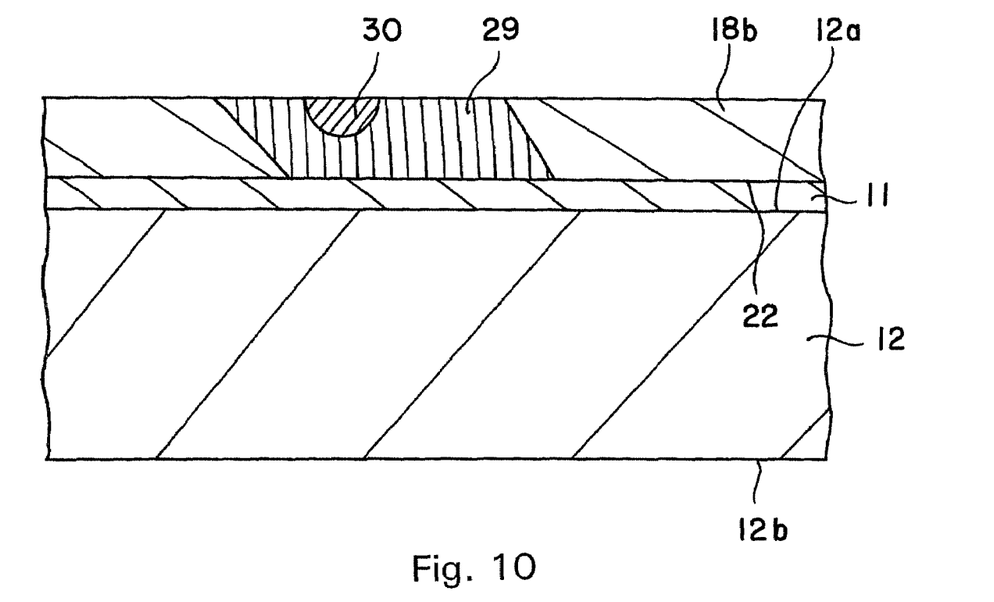
FIG. 10 is a cross-sectional view of an optical waveguide substrate having a diffused optical waveguide 30.

Alternatively, instead of forming the ridge, a diffused channel optical waveguide 30 of FIG. 10 can be formed after the formation of the structure illustrated in FIG. 8.

The type of ferroelectric single crystal of which the ferroelectric single crystal substrate is to be formed is not limited; but a single crystal of lithium niobate ($LiNbO_3$), lithium tantalate ($LiTaO_3$), a lithium niobate-lithium tantalate solid solution, or $K_3Li_2Nb_5O_{15}$ is particularly preferred.

In order to further enhance the optical damage resistance of the optical waveguide, one or more metallic element(s) selected from the group consisting of magnesium (Mg), zinc (Zn), scandium (Sc) and indium (In) can be contained in the ferroelectric single crystal; magnesium is particularly preferred. From the viewpoint of the fulfillment of definite polarization inversion characteristics (conditions), particular preference is given to any one of a lithium niobate single crystal, a lithium niobate-lithium tantalate solid solution single crystal and a lithium tantalate single crystal each containing magnesium. And further, in the ferroelectric single crystal, a rare earth element can be contained as a dope component. Such a rare earth element acts as an additional element for laser oscillation. As the rare earth element, Nd, Er, Tm, Ho, Dy or Pr is particularly preferred.

It is particularly preferred that a so-called Z-cut substrate, offcut X substrate, or offcut Y substrate is used as the substrate. When an offcut X substrate or an offcut Y plate is used, the offcut angle is not particularly limited; but particularly preferably, the offcut angle is 1° or larger and 20° or smaller. When an X-cut substrate or a Y-cut substrate may be used, the uniform electrode is provided on one surface of the substrate, not provided on the back surface of the substrate, so that a voltage can be applied between the interdigitated electrode and the uniform electrode. In this case, the counter electrode need not be provided, but may be left as a floating electrode. And further, when a Z-cut substrate is used, the uniform electrode can be provided on the back surface of the substrate and a voltage can be applied between the interdigitated electrode and the uniform electrode. In this case, the counter electrode is not necessarily required, but may be left as a floating electrode.

In forming the periodic domain inversion structure, materials for the interdigitated electrode, the counter electrode, and the uniform electrode are not limited; but preference is given to Al, Au, Ag, Cr, Cu, Ni, Ni—Cr, Pd, or Ta. Moreover, a method for forming the interdigitated electrode, the counter electrode, and the uniform electrode is not particularly limited; examples of such method include vacuum evaporation and vacuum sputtering. The applied voltage is preferably 3 kV to 8 kV, and the pulse frequency is preferably 1 Hz to 1000 Hz.

A material for the supporting body to be adhered to the ferroelectric single crystal substrate is required to have excellent insulating properties, a uniform volume resistivity within the material, and a predetermined structural strength. Examples of such a material include silicon, sapphire, quartz, glass, lithium niobate, lithium tantalate, a lithium niobate-lithium tantalate solid solution, MgO-doped lithium niobate, MgO-doped lithium tantalate, ZnO-doped lithium niobate, and ZnO-doped lithium tantalate.

A material for the adhesive for adhering the ferroelectric single crystal substrate to the supporting body is not particularly limited; examples of an adhesive include acrylic and epoxy ultraviolet curing resins, acrylic and epoxy thermosetting resins, and acrylic and epoxy ultraviolet curing, thermosetting resins.

A method for forming the channel optical waveguide is not particularly limited. For example, the ridge optical waveguide can be formed by laser ablation, grinding, dry etching, or wet etching. The inner-diffused optical waveguide 30 can be formed by, for example, an ion exchange method such as a proton exchange method or the like or a titanium or zinc inner diffusion method.

The periodic polarization-inverted portion formed according to the present invention is applicable to any optical devices requiring such polarization-inverted portion. Examples of such optical devices include harmonic-generating devices such as second harmonic-generating devices and so on. When used as a second harmonic-generating device, the wavelength of harmonics is preferably 330 to 1600 nm.

EXAMPLES

An optical waveguide substrate having the structure illustrated in FIG. 5 (Comparative Example) was produced by using the method described with reference to FIGS. 1 to 5. Moreover, an optical waveguide substrate having the structure illustrated in FIG. 9 (Inventive Example) was produced by using the method described with reference to FIGS. 1, 2, and 6 to 9.

On the one main face 8a of the MgO 5% doped lithium niobate-5 degree offcut Y substrate 8 of 0.5-mm-thick, the interdigitated periodic electrode 3 with the electrode pieces evenly spaced by 6.56 µm was formed by photolithography method. On the whole of the other main face 8b of the substrate, the electrode film 9 was formed, following which a pulse voltage was applied to form the periodic domain inversion structure 29.

The substrate surface 8a where the inversion structure 29 was formed was radiated with laser light from an excimer laser to form the rectangular recess 20 in the center and four corners of the substrate 8. The depth "D" of the recess was measured with a contact-type surface roughness tester. Then, as shown in FIG. 6(b), the one main face 8a of the substrate was mirror-polished on a nonwoven fabric by the use of a polishing pad and colloidal silica abrasive grains, and at the time when the recess 20 disappeared from the surface, the polishing was terminated. The machining depth "d" was made equal to the depth "D" of the recess 20 (see FIG. 7(a)).

As shown in FIG. 7(b), an adhesive 11 was applied to the 1-mm-thick non-doped lithium niobate substrate 12. Thereafter, the substrate 12 and the MgO-doped lithium niobate substrate 8, that was subjected to the surface removing process, were bonded together, and then the other main face of the MgO-doped lithium niobate substrate 8 was cut by grinding and polishing until the thickness reached 3.8 µm (see FIG. 8). The substrate 18 thus obtained functions as slab optical waveguides and wavelength conversion elements.

Next, the channel ridge waveguide 14 was formed by laser ablation processing (see FIG. 9). The ridge 14 formed was 4.5 µm in width and 2 µm in depth. After the ridge formation, a 0.5-µm-thick $Ta_2O_5$ film was formed on the surface of the waveguide by sputtering.

Figure 11:
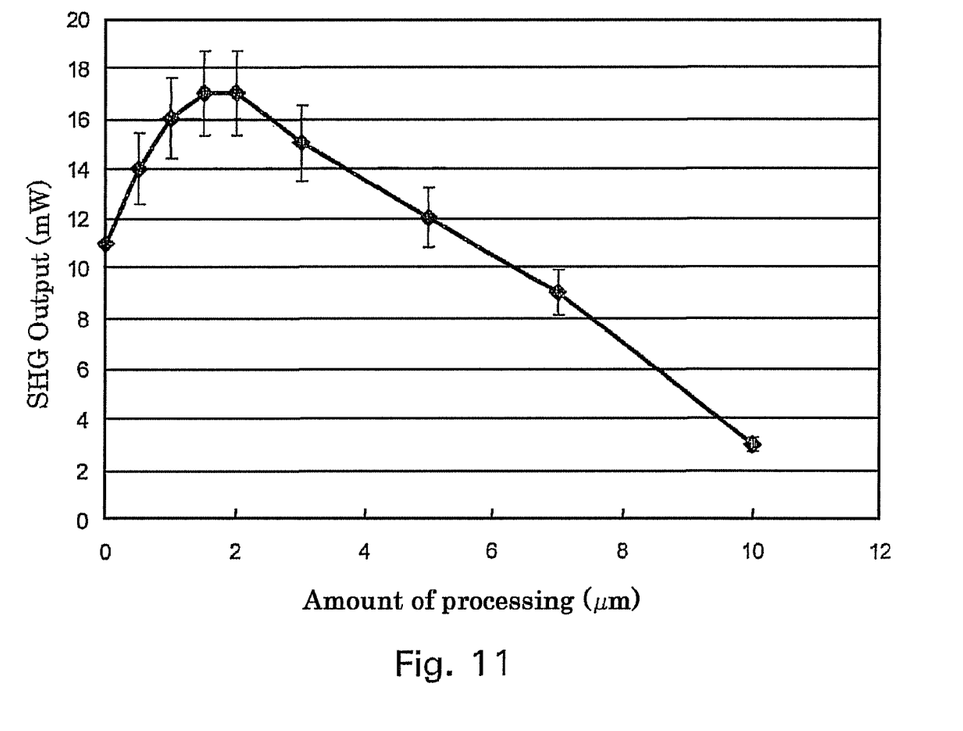
FIG. 11 is a graph showing the relationship between the quantities processed in the surface removal step and second harmonic outputs.

The substrate was cut into devices of 12 mm in length and 1.4 mm in width with a dicer, and then the both end faces thereof were polished. The optical characteristics of the waveguides were determined by means of a titanium-sapphire laser. By adjusting the oscillation output of the laser to 100 mW and condensing the fundamental light on the end face of the waveguide through a lens, the concentration of an output of 55 mW could be produced in the waveguide. Table 1 and FIG. 11 present second harmonic (SHG) outputs obtained by changing the wavelength of the titanium-sapphire laser to a wavelength to be phase-matched. In addition, the wavelength of fundamental light at the time of the phase matching was 1058 to 1060 nm.

TABLE 1

| Amount of Processing (µm) | SHG Output (mW) |
| --- | --- |
| 0.0 | 11.0 |
| 0.5 | 14.0 |
| 1.0 | 16.0 |
| 1.5 | 17.0 |
| 2.0 | 17.0 |
| 3.0 | 15.0 |
| 5.0 | 12.0 |
| 7.0 | 9.0 |
| 10.0 | 3.0 |

As seen from the results, it has been found that in the case where the periodic domain inversion structure is formed in the substrate by using the voltage application method and then the surface region on the side having the periodic domain inversion structure of the substrate is removed by machining, the second harmonic generation output is increased considerably.

Although the specific embodiments of the present invention have been described hereinabove, the invention is not limited to the embodiments, and there can be practiced while making various modifications and alterations without departing from the scope of the appended claims.

The invention claimed is:

1. A method of producing an optical waveguide substrate comprising an optical waveguide with a periodic domain inversion structure formed therein, the method comprising the steps of:
   applying a voltage on an interdigitated electrode provided on one main face of a single-domain ferroelectric single crystal substrate to form the periodic domain inversion structure;
   removing the interdigitated electrode;
   then removing the surface region of the ferroelectric single crystal substrate by machining the one main face of the substrate by a depth of 0.5 to 3.0 µm to form a machined surface; and
   then forming the optical waveguide in the ferroelectric single crystal substrate.

2. The method of claim 1, further comprising the step of forming a recess on the one main face of the ferroelectric single crystal substrate, the step of removing the surface region being then carried out.

3. The method of claim 2, wherein the step of removing the surface region is terminated at the time when the recess disappears.

4. The method of claim 1, further comprising the steps of:
   adhering the machined surface of the ferroelectric single crystal substrate to a supporting body after the step of removing the surface region; and
   thinning the ferroelectric single crystal substrate by subjecting the other main face of the substrate to a thinning process.

5. The method of claim 1, wherein the optical waveguide formed in the ferroelectric single crystal substrate is of channel type.

6. The method of claim 5, wherein the optical waveguide of channel type is formed on the other main face of the ferroelectric single crystal substrate.

7. The method of claim 1, wherein the ferroelectric single crystal substrate comprises a single crystal selected from the group consisting of a lithium niobate single crystal, a lithium tantalate single crystal and a lithium niobate-lithium tantalate solid solution single crystal.

* * * * *